(12) United States Patent
Tahan (10) Patent No.: US 6,915,351 B2
(45) Date of Patent: Jul. 5, 2005

(54) COMMUNITY SEPARATION CONTROL IN A CLOSED MULTI-COMMUNITY NODE

(75) Inventor: Thomas E. Tahan, La Jolla, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 830 days.

(21) Appl. No.: 09/740,100

(22) Filed: Dec. 18, 2000

(65) Prior Publication Data

US 2002/0078199 A1 Jun. 20, 2002

(51) Int. Cl.[7] .................... H01L 12/28; H01L 12/56
(52) U.S. Cl. .............. 709/242; 709/225; 709/242; 709/249; 370/389; 370/392; 370/400; 370/395.31
(58) Field of Search .................. 709/224, 225, 709/240, 242, 249, 227; 370/355, 389, 392, 400, 395.31; 713/201

(56) References Cited

U.S. PATENT DOCUMENTS

| | | | | | |
|---|---|---|---|---|---|
| 5,530,806 | A | * | 6/1996 | Condon et al. | 370/397 |
| 5,884,025 | A | * | 3/1999 | Baehr et al. | 709/249 |
| 5,889,953 | A | * | 3/1999 | Thebaut et al. | 709/224 |
| 5,918,018 | A | * | 6/1999 | Gooderum et al. | 709/225 |
| 6,047,325 | A | * | 4/2000 | Jain et al. | 709/225 |
| 6,158,008 | A | * | 12/2000 | Maria et al. | 713/201 |
| 6,182,226 | B1 | * | 1/2001 | Reid et al. | 709/225 |
| 6,226,751 | B1 | * | 5/2001 | Arrow et al. | 709/227 |
| 6,256,307 | B1 | * | 7/2001 | Salmonson | 370/392 |
| 6,349,098 | B1 | * | 2/2002 | Parruck et al. | 370/395.6 |
| 6,700,874 | B1 | * | 3/2004 | Takihiro et al. | 370/400 |
| 6,754,716 | B1 | * | 6/2004 | Sharma et al. | 709/238 |
| 6,772,346 | B1 | * | 8/2004 | Chess et al. | 709/242 |

OTHER PUBLICATIONS

"Department of Defense Trusted Computer System Evaluation Criteria," Dec. 1985., pp. 1–82.
Fithen et al., "Deploying Firewalls," May 1999, pp. 1–63.
"Trusted Solaris™ 8 Operating Environment," Nov. 2000, pp. 1–24.
"SunScreen™ Secure Net 3.0," Jul. 1999, pp. 1–66.

* cited by examiner

*Primary Examiner*—Ario Etienne
*Assistant Examiner*—Ramy M Osman
(74) *Attorney, Agent, or Firm*—Meyertons Hood Kivlin Kowert & Goetzel, P.C.; B. Noël Kivlin; Rory D. Rankin (57) ABSTRACT

A method and mechanism of enforcing, in a computer network, a community separation policy wherein the data of a particular user community should be accessible only by members of that community. A Multi-Community Node (MCN) processes information for users in multiple communities and must enforce the community separation policy. In a closed MCN, which runs only applications trusted to enforce the community separation policy, the method and mechanism performs a set of checks on packets received from and to be transmitted on a network, to ensure that all communications comply with the community separation policy. The checks (1) prevent communications from a network used by one community or communities to a network used by different communities; (2) ensure that packets sent by the MCN are output on an interface attached to a network for the intended community; and (3) detect when remote nodes communicating with the MCN spoof their source network address to masquerade as a node in another community. The enforcement method and mechanism use a database of associations of sets of communities corresponding to each network addresses of the MCN and each node with which it communicates, and of the set of communities associated with each network attached to the MCN.

30 Claims, 10 Drawing Sheets

Network Interface-Community Association (NICA) — 530

| Network Interface Identifier 531 | Interface Community Set (IFCS) 532 | Description 533 |
|---|---|---|
| if0 | A,D,G,M,Q | Community {A,D,G,M,Q} Network |
| if1 | D,Q | Community {D,Q} Network |
| if2 | A | Community {A} Network |
| if3 | G | Community {G} Network |
| if4 | M | Community {M} Network |

Network Address-Community Association (NACA) — 540

| Network Address, Address List or Address Range 541 | Network Address Community Set (NACS) 542 | Description 543 |
|---|---|---|
| 195.10.*.1 | A,D,G,M,Q | MCN 510's Network Interfaces |
| 195.10.1.2-195.10.1.254 | A,D,G,M,Q | Community {A,D,G,M,Q} Nodes |
| 195.10.2.2-195.10.2.14 | D,Q,X | Community {D,Q,X} Nodes |
| 195.10.3.2-195.10.3.62 | A | Community {A} Nodes |
| 195.10.4.2-195.10.4.110 | G | Community {G} Nodes |
| 195.10.5.2-195.10.5.225 | M | Community {M} Nodes |

COMMUNITY SEPARATION CONTROL IN A CLOSED MULTI-COMMUNITY NODE

BACKGROUND OF THE INVENTION

1. Field of the Invention

This invention is related to the field of computer network security and, more particularly, to ensuring the separation of different user communities.

2. Description of the Related Art

With the ever expanding use of computer networks throughout society and the increasing interconnection of computer networks and users has come an increasing importance on maintaining the security of data. It is common for enterprise computer networks to have more than one user community, each with its own set of data. For example, a bank may have a production community which includes persons who are involved in the day to day workings of the bank. In addition, a bank may have a development community which includes persons working to develop and test new banking computer applications. Further, a bank may have a public web site which allows Internet users to obtain information or services related to the bank. Each of these user communities requires access to different sets of data which in some cases may be mutually exclusive.

In an enterprise network, some computing resources may be dedicated to users of a single community, and others may be shared among users of multiple communities. Single Community Nodes (SCNs) are network nodes (e.g., computers, networking equipment, etc.) processing information on behalf of users in a single community. Multi-Community Nodes (MCNs) are network nodes processing information on behalf of individuals in more than one community. Examples of MCNs include servers, routers, and administrative workstations. Executing on MCNs are Multi-Community Applications (MCAs). MCAs are software performing functions on behalf of users in more than one community. MCAs may run within the operating system kernel or communications protocol software, or may be programs running under the control of the operating system in an MCN.

Generally, an enterprise has in place a network security policy which includes a community separation policy stating that the data of a particular community should only be accessible by members of that community. Consequently, each user on the computer network must be prohibited from: (1) accessing the data of a community of which he is not a member, and (2) exposing the data of a community of which he is a member to a user outside that community. When resources such as MCNs are shared by users in more than one community, the potential for a breach of the community separation policy is increased and adequate enforcement of the policy takes on greater importance. Threats to the security of computer network data include threats from "external intruders" and threats from "malicious insiders". An external intruder is a user in one community who attempts to access or modify the data of another community, or disrupt service in another community by interfering with the normal and proper operations of the computer resources used by the other community. On the other hand, a malicious insider is a user in one community who attempts to leak data from his own community to a user in another community, by sending data packets to another community, causing data packets from his community to be misrouted, making data from his community available to external intruders, or otherwise using computer resources to leak or signal information. It should be noted that an insider may inadvertently leak information to another community due to human error or faulty software logic. This may have the same effect as the malicious insider who deliberately causes such leakage.

One well known method of providing for community separation in multi-community enterprise networks includes segmenting the network by community such that all computing resources are dedicated to a community and no resources are shared between communities. The network segmentation methods involve replicating servers, routers, bridges, hubs, switches, and cables, thereby physically segregating user communities. However, such a replication technique is not only costly, it also provides significant operational complexities. For example, one type of server is a network management station. If such a station were replicated and each station's access were physically restricted to a single community's computing resources, the network administrator for the enterprise would be able to monitor and control only the network resources for a single community from a single station. However, the role of the network administrator requires monitoring and control of the entire network. Hence, the security approach significantly complicates the management of the network.

Another practiced method of providing community separation is to use firewalls to control the flow of information between communities. A firewall is a method used to control information flow between two or more networks by blocking or permitting flows according to a predetermined set of rules based on the source and destination of the data, the requested service, and other criteria. Firewalls are frequently used by an enterprise to control the access of those on an external network, such as the Internet, to the enterprise's inner network. Firewalls may also be used to protect some parts of an inner network from other parts of an inner network. However, the rules associated with firewalls can be complex and onerous to set up. It is also difficult to validate that the rule set enforces community separation, and such validation must be done each time the rules are modified.

A third method of providing community separation involves incorporating support in applications on the network for cryptographic protocols and data security methods. However, such an approach is undesirable as it can be very costly in application development and can be operationally burdensome to administer.

To further provide for data security, it is common for the network topology and node connectivity to be controlled. Such controls may include physical separation, logical separation (such as in Virtual Local Area Networks [VLANs]), special privileges or authorizations, or cryptographic methods (such as Virtual Private Networks [VPNs]). Such methods typically provide that each network node is physically or logically connected to a network (including a network segment, subnetwork, VLAN, network zone, network partition, network tunnel, or VPN) only if the node is authorized to access the community data being communicated over the network.

In addition, Multi-Community Applications may be designed so that they may be "trusted", i.e., do not violate the community separation policy. In particular, when an MCA sends information to a user on another network node, it is trusted not to disclose information belonging to communities of which that user and his computer are not members. Some MCNs are "closed" nodes on which only trusted MCAs are allowed to run and which do not allow unrestricted user access. However, even if the MCAs are trusted, the networking protocols within the MCN could allow community information to be disclosed in violation of the community separation policy, especially if they do not contain mechanisms which explicitly provide for community separation enforcement.

SUMMARY OF THE INVENTION

One or more of the problems outlined above are in large part solved by the methods and mechanisms described herein. Broadly speaking, a method and mechanism of community separation control in a multi-community node are contemplated. Generally, the method and mechanism include determining a packet community set (PCS) of a first data packet, discarding the data packet if the PCS is null or alternately if the PCS is not a subset of the intersection of a source network address community set (NACS) and a destination NACS of the data packet, and allowing further processing of the data packet if the PCS is not null. The PCS of the data packet may be determined by one of the following alternative: calculating an intersection of a source network service community set (NSCS) and a destination NSCS of the data packet; calculating an intersection of a source network address community set (NACS) of the data packet, a destination NACS of the data packet, and an application community set (ACS) of the process which sent the data packet; or decoding the PCS from the header of the data packet. The method and mechanism may include consulting a community information base which maintains community set associations.

In one embodiment, if the data packet is outgoing, the method and mechanism may include discarding the data packet if the PCS is not a subset of an ACS of the process which sent the data packet, and discarding the data packet if the PCS is not a subset of an interface community set (IFCS) of the interface over which the data packet is to be output. Otherwise, further processing may be permitted. If the data packet is incoming, the data packet is discarded if the PCS is not a subset of an IFCS over which the data packet was received. If the data packet is incoming and its destination is the local host, the data packet is discarded if the PCS is not a subset of an ACS of the destination process of the data packet. If the data packet is incoming and its destination is a remote host, the data packet is discarded if the PCS is not a subset of the IFCS of the output interface corresponding to the remote host. Other embodiments may include encodeding the PCS in the data packet prior to transmitting the data packet to a remote node.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF THE INVENTION

Overview

Generally speaking, the methods and mechanisms described herein:

Prevent communications from a network used by one community or communities to a network used by different communities;

Ensure that packets sent by the MCN are output on an interface attached to a network for the intended community; and Detect when remote nodes communicating with the MCN spoof their source network address to masquerade as a node in another community.

Among the embodiments described herein are the following:

1. A Community Route Filter (CRF) in the protocol stack of the MCN applies rules on each incoming or outgoing packet. The packet's source and destination network address are used to determine the user community or set of communities to which a packet belongs. The CRF ensures that packet can never flow to networks outside the packet's communities.

2. As in Approach 1, a CRF in the protocol stack of the MCN applies rules on each incoming or outgoing packet. The CRF prevents a packet from flowing to networks outside the packet's communities. The enforcement has the same effect as with Approach 1, but the database is organized differently and rules are expressed differently.

3. The community separation policy is enforced by ensuring that all routing table entries comply with the policy. This, combined with restrictions on packet forwarding between interfaces and other per packet validations, ensures that a packet cannot flow to networks outside the packet's communities.

The methods and mechanisms described herein use a database of associations of sets of communities corresponding to each network addresses of the MCN and each node with which it communicates, and of the set of communities associated with each network attached to the MCN. The database information and organization may differ for the alternative approaches described herein. In general, the database information is entered into the MCN by a trusted administrator.

Community Separation Control in Closed Multi-Community Nodes

Figure 1:
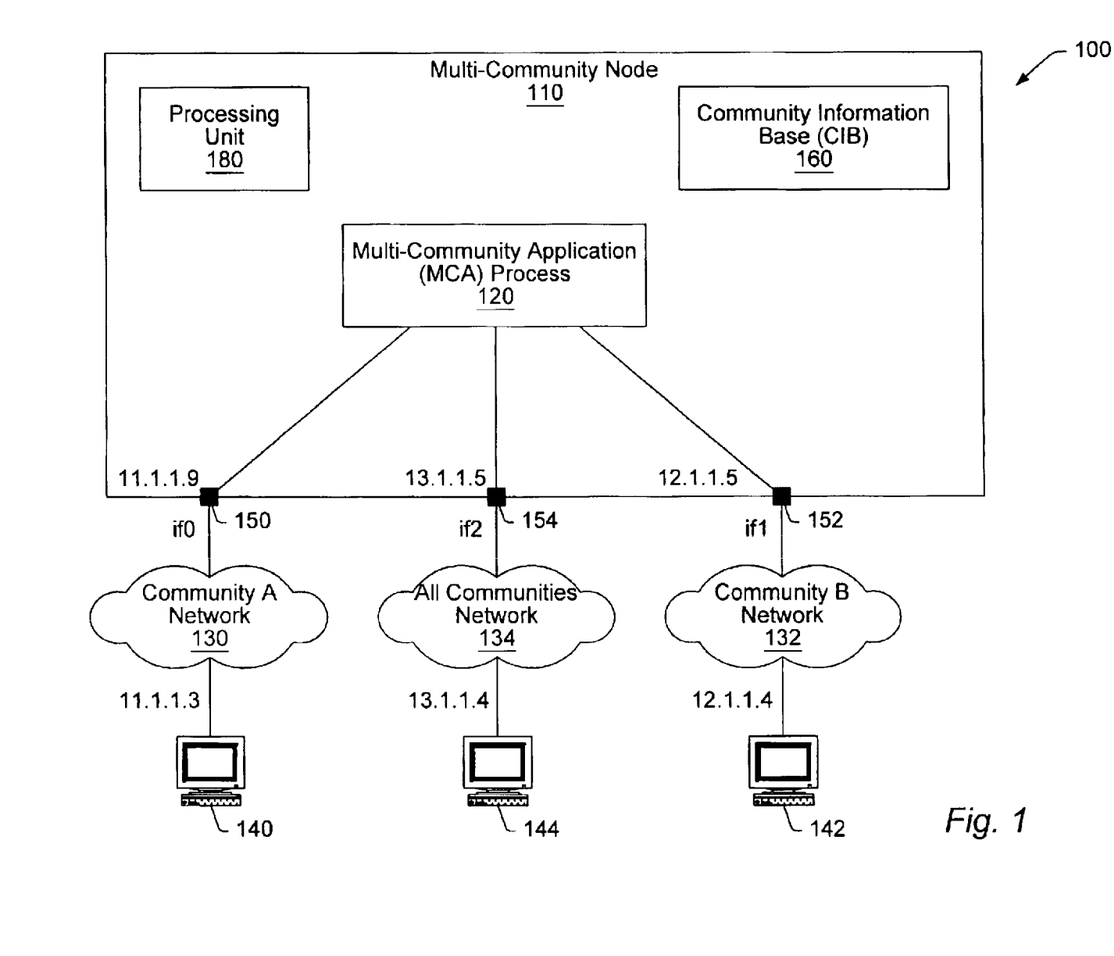
FIG. 1 is a diagram of one embodiment of a closed MCN in a multi-community network.

Turning now to FIG. 1, a diagram illustrating one embodiment of a computer network 100 is shown. Included in computer network 100 is MCN 110, a node serving a set of user communities including communities A, B, and any other communities in network 100. Also on network 100 is another MCN, 144, serving the same communities as MCN 110, and two single community nodes: a community A node 140, and a community B node 142.

Community network 100 contains three subnetworks. Network 130, used for community A communications, Network 132, used for community B communications, and network 134, used for communications between MCN 110 and MCN 144 which could potentially contain data for any community.

MCN 110 includes interfaces if0 150, if1 152, and if2 154. MCN 110 also includes a Multi-Community Application Process (MCA) 120, which is assumed to be trusted not to leak data between communities, and Community Information Base (CIB) 160. Community A network 130 is coupled to MCN 110 via interface if0 150, community B network 132 is coupled to MCN 110 via interface if1 152, and the all communities network 134 is coupled to MCN 110 via interface if2 154. Also included in MCN 110 is processing unit 180. Processing unit 180 may be a general purpose processor which may be configured to execute software or may be special purpose logic which is specifically designed for data packet filtering operations and other functions. In FIG. 1, community A network 130 and community B network 132 represent separate user communities and all communities network 134 represents a network accessible by MCNs serving all user communities. FIG. 1 also shows exemplary addresses associated with MCN 110 network interfaces and with the network interfaces of other network nodes. Interfaces if0 150, if1 152, and if2 154 have addresses 11.1.1.9, 12.1.1.5, and 13.1.1.5, respectively. Hosts 140, 142, and 144 have addresses 11.1.1.3, 12.1.1.4, and 13.1.1.4, respectively. For illustrative purposes, Internet Protocol (IP) version 4 addresses are used in the description herein. However, IPv6 addresses or addresses of any other network layer or data link layer protocol may also be used. In one embodiment, MCN 110 includes a number of processors and is running a single instance of an operating system.

Community Route Filtering

As shown in FIG. 1, the network topology is designed keep user communities separated. Only MCNs have the capability to violate the community separation policy. With this topology, if MCNs enforce community separation, then enforcement is network-wide. More precisely, the following topology rule must be enforced when the network administrators connect the network nodes to the network and configure the network switches and other network components and mechanisms: a node may be physically or logically connected to a network only if the community or set of communities of the node includes the community set of the network. The term "network" as used herein includes a subnetwork, network segment, virtual local area network (VLAN), network partition, network zone, virtual private network (VPN), network tunnel, or any other suitable configuration. The community set of a network is the set of communities for which information may be communicated over the network, not to include communities whose information is encrypted in a manner preventing access by nodes attached to the network.

In one embodiment, MCN 110 is a closed node. It is assumed that all application software running on MCN 110, referred to as Multi-Community Applications (MCAs), are trusted to enforce community separation. The MCN 110 is further assumed to not allow unrestricted user access. Users are permitted to access information in the MCN only if the access is permitted by the MCAs on the MCN 110.

With these assumptions, what is needed is to ensure that the protocol software in the MCN 110 provides community separation enforcement and that the MCN policy enforcement cannot be compromised by entities outside the MCN. In general, MCN 110 either generates packets to send to a variety of destinations, or receives packets from other nodes to be processed by the MCA 120 or to be forwarded to a variety of destinations. In one embodiment, to ensure that community separation policy is enforced for MCN 110's network communications, a Community Route Filter (CRF) in the protocol stack of MCN 110 applies rules on each incoming or outgoing packet. If an incoming or outgoing packet is being routed in compliance with the community separation policy, the packet is allowed to pass through the filter. Otherwise, the packet is discarded and the event may be recorded in a log of security relevant and other events.

Generally speaking, functions performed by the CRF in MCN 110 may include, but are not limited to, the following: (1) preventing communications from a network used by one community or communities to a network used by different communities; (2) ensuring that packets sent by the MCN are output on an interface attached to a network for the intended community, determined from the communities associated with the source and destination network addresses; and (3) detecting when remote nodes communicating with the MCN spoof their source network address to masquerade as a node in another community.

In another embodiment, the MCN is configured to control routing table updates so that the all entries in the table comply with the community separation policy. In addition, a packet forwarding filter may be inserted in the protocol stack for packets being forwarded by the MCN from one network interface to another in order to ensure that there is a community in common between the incoming and outgoing networks' community sets.

In the descriptions contained herein the following notation is used:

- A "Community Set" is a set of communities, which may consist of no communities (the null community set) or any number of communities. Each individual community within the community set is said to be a "member" of the set.
- "Curly brackets {}" indicate a set of communities encompassed by the brackets, e.g., {a,b,c, . . . }, indicates the set of communities a, b, c, etc., where the names of the member communities are encapsulated in the curly brackets, separated by commas.
- The "intersection" of two sets is the set of members belonging to both sets. An "ampersand" indicates an intersection of two communities or sets of communities, e.g., x & y, indicates the intersection of two sets x and y, where the names of the communities being intersected precede and follow the ampersand.
- A set X is a "superset" of a set Y if and only if all members of Y are also members of X. It is said that X "includes" Y when X is a superset of Y.
- A set X is a "subset" of a set Y if and only if all members of X are also members of Y. It is said that X "is included in" Y when X is a subset of Y.

Community Route Filtering Approach 1

In one embodiment, to ensure that community separation policy is enforced for MCN 110's network communications, a Community Route Filter (CRF) in the protocol stack of MCN 110 applies rules on each incoming or outgoing packet. The packet's source and destination network address are used to determine the user community or set of communities to which a packet belongs. The CRF ensures that a packet can never flow to networks outside that packet's communities. If an incoming or outgoing packet is being routed in compliance with the community separation policy, the packet is allowed to pass through the filter. Otherwise, the packet is discarded and the event is recorded in a log of security relevant and other events.

Community Information Base (CIB)

The CRF rules use information configured into the MCN 110 by a trusted administrator, either directly, remotely, or through a management station. In one embodiment, this information is called a Community Information Base (CIB) for the MCN. In the embodiment shown in FIG. 1, two associations are maintained in the CIB: (1) for each node in the enterprise network (identified by the node's network address), the user community or set of communities which the node serves, and (2) for each network interface on the MCN, the user community or set of communities associated with the network attached to the network interface. Association 1 may be referred to as the Network Address Community Set (NACS). Addresses from the Internet Protocol (IP) or other network layer or data link layer protocols may be used. Association 2 may be referred to as the Interface Community Set (IFCS). The MCN must protect the CIB from being modified by untrusted entities.

Packet Processing

The CRF rules described below specify the filtering applied to outgoing and incoming packets, respectively:

MCN Send Rule for Outgoing Packets

1. Determine the Packet Community Set (PCS) of the packet from the intersection of the source NACS and the destination NACS.
2. If the PCS is null (empty), discard the packet and record the event in a log of security relevant and other events.
3. If the IFCS of the interface on which the packet will be output is not a superset of the PCS, discard the packet and record the event in a log of security relevant and other events.
4. Allow transmit processing to proceed on the packet.

MCN Receive Rule for Incoming Packets

1. Determine the PCS of the packet from the intersection of the source NACS and the destination NACS.
2. If the PCS is null (empty), discard the packet and record the event in a log of security relevant and other events.
3. If the IFCS of the interface on which the packet was received is not a superset of the PCS, discard the packet and record the event in a log of security relevant and other events.
4. Allow receive processing to proceed on the packet.

Figure 2:
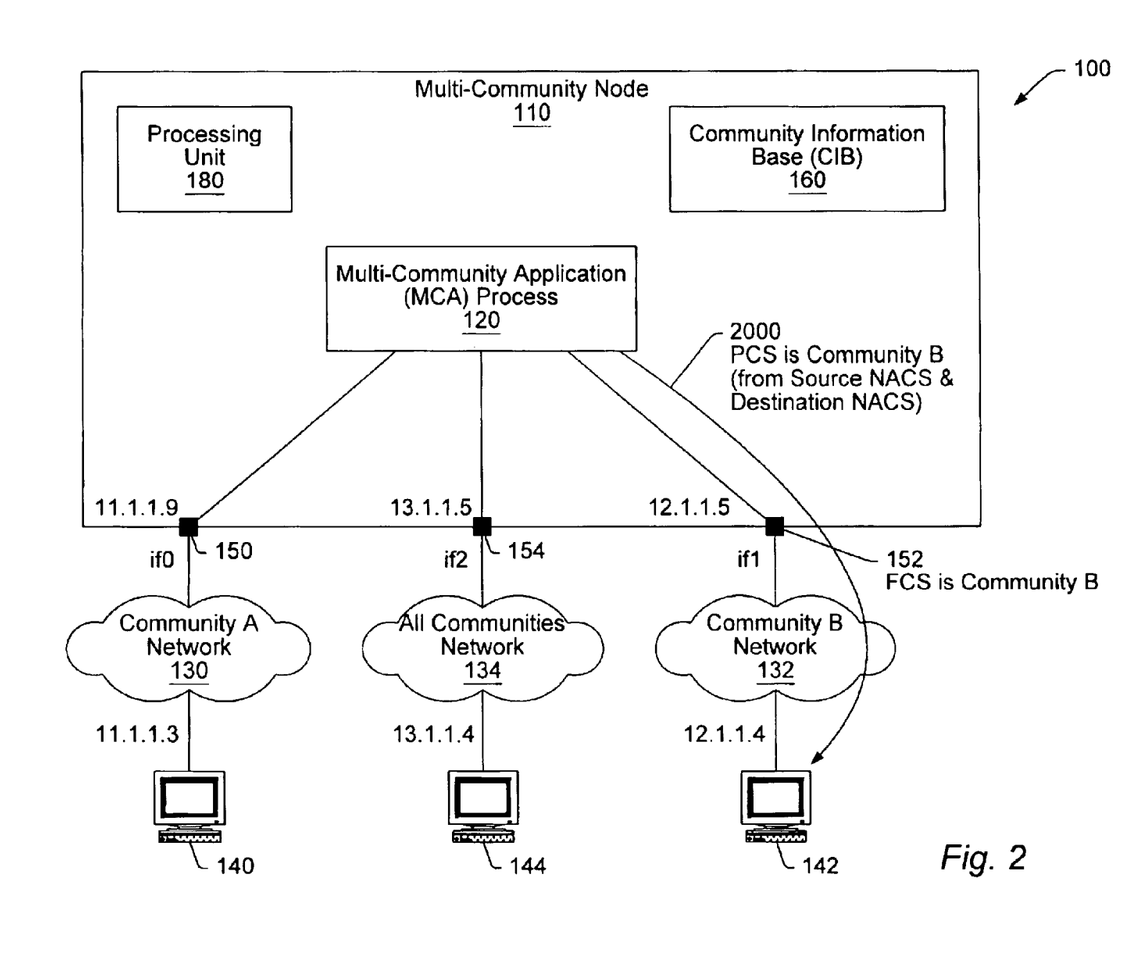
FIG. 2 is a diagram illustrating a community route filter send rule in a closed MCN.

FIG. 2 illustrates an example of a CRF send rule in computer network 100. In the example shown, assume that MCN 110 is processing an outgoing packet 2000 that was either generated within MCA 100, or received on one of MCN 110's network interfaces for forwarding to another network attached to MCN 110. Packet 2000 has an exemplary source NACS of {A,B,C} (the community set associated with MCN 110 and its network addresses), and a destination NACS of {B}. MCN 110 determines the PCS of packet 2000 to be {B}, the intersection of its source NACS {A,B,C} and destination NACS {B}. Because the PCS={B} is not null, the data packet is not immediately discarded. Next, MCN 110 validates whether the IFCS of if 1, the interface on which the packet will be transmitted, includes the PCS of the packet. In this case, the IFCS={B} and the PCS={B}. Therefore, the data packet 2000 is allowed to be output on if 1. If the IFCS did not include the PCS, the packet would be discarded and the event would be recorded in a log of security relevant and other events.

Figure 3:
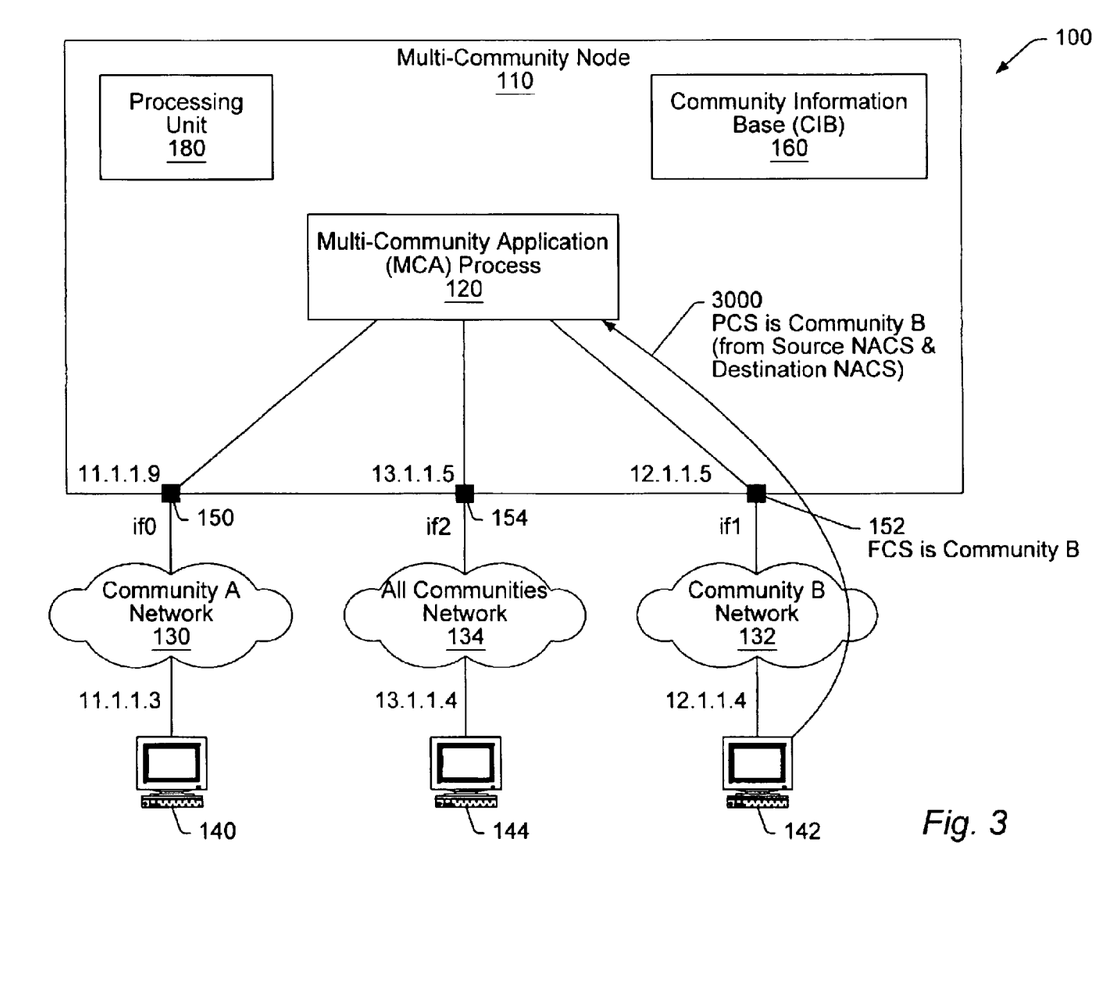
FIG. 3 is a diagram illustrating the community route filter receive rule in a closed MCN.

FIG. 3 illustrates an example of a CRF receive rule in computer network 100. In the example shown, MCN 110 is processing an incoming packet 3000 that was received on interface if1. Packet 3000 has a source NACS of {B} and a destination NACS of {A,B,C}. MCN 110 determines that the PCS of packet 3000 is {B}, the intersection of the source and destination NACS. Because the PCS={B} which is not null, the data packet is not immediately discarded. Next, MCN 110 validates whether the IFCS of if1, the interface on which the packet was received, includes the PCS of the packet. In this case, the IFCS={B} and the PCS={B}. Therefore, receive processing for the data packet 2000 is allowed to proceed. If the IFCS did not include the PCS, the packet would be discarded and the event would be recorded in a log of security relevant and other events.

Figure 4A:
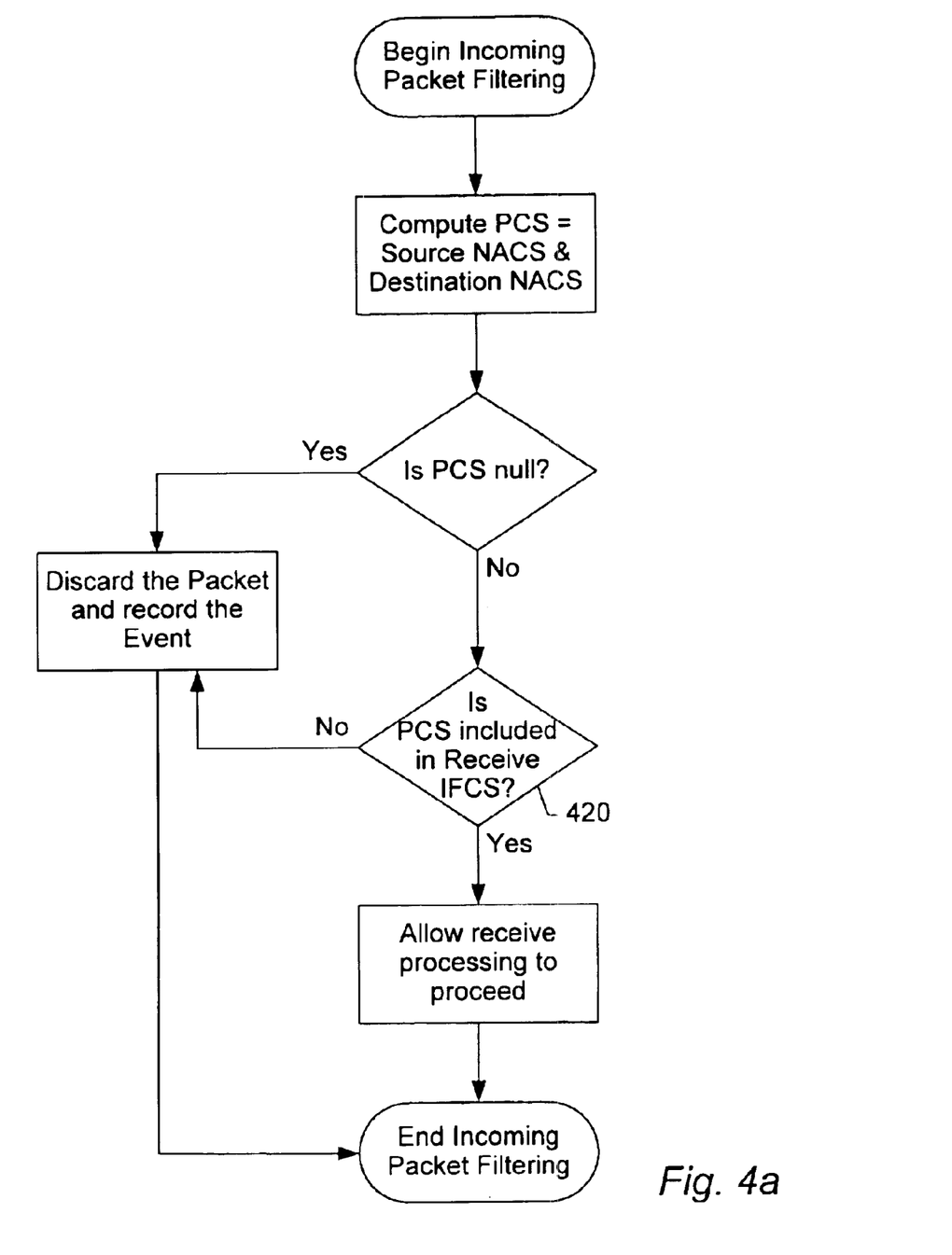
FIG. 4a is a flowchart illustrating one embodiment of a community route filter.

FIG. 4a is a flowchart illustrating one embodiment of a CRF. In the figure, it is assumed that the CRF is positioned between the data link layer and network layer, though alternative embodiments are possible and are contemplated. In FIG. 4a, the entry point "Begin Incoming Packet Filtering" is entered when a packet is received on one of MCN 110's network interfaces. The destination of the packet may be MCN 110, or MCN 110 may be forwarding the packet to another network. For incoming packet filtering, the CRF in MCN 110 computes the PCS from the intersection of the Source NACS and Destination NACS of the incoming packet. The PCS would be null if the source and destination nodes have no communities in common. Since attempts to communicate between such nodes is a violation of the community separation policy, the CRF discards the packet and records the event in a log of security-relevant and other events. If the PCS is not null, the CRF then checks whether the PCS is included in the IFCS of the interface on which the packet was received (decision block 420). If it is not, this is a violation of the community separation policy and the packet is discarded. For example, attacker on a node in Community A may be attempting to communicate with a peer on node in Community B by using an address in Community B as the source address of the packet, thereby masquerading as a Community B node. If the PCS is not included in the IFCS, the CRF discards the packet and records the event. If the PCS is not null, the CRF allows further packet receive processing to proceed.

Figure 4B:
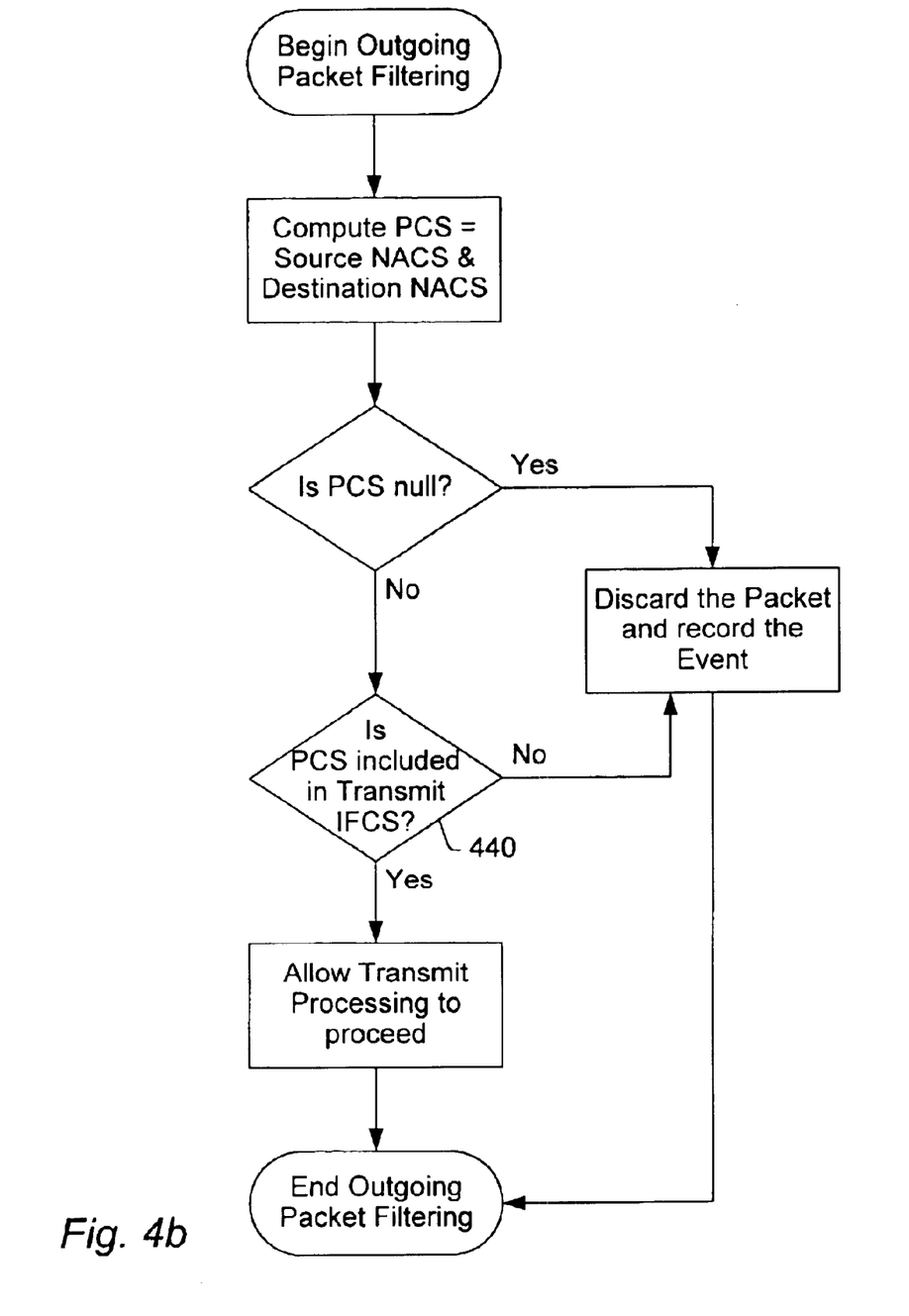
FIG. 4b is a flowchart illustrating one embodiment of a community route filter.

FIG. 4b is a flowchart illustrating one embodiment of a CRF applied to an outgoing packet. The outgoing packet may have been generated by MCN 110, or may have been received on one of MCN's network interfaces to be forwarded by MCN 110 and output on another network interface. For outgoing packet filtering, the CRF in MCN 110 starts with computing the PCS from the intersection of the Source NACS and the Destination NACS. A null PCS indicates a violation of the community separation policy and the CRF discards the packet and records the event in a log of security relevant and other events. For example, an attacker in Community A may attempt to have MCN 110 forward a packet from a Community A network to a Community B network. If the PCS is not null, MCN 110 determines whether the PCS is included in the IFCS of the network interface on which the packet will be output (decision block 440). If it is not, a violation of the community separation security policy has been attempted, and the CRF discards the packet and records the event in a log of security relevant and other events. Otherwise the CRF allows further transmit processing to proceed for the packet.

It should be noted that the application of community route filtering is "stateless" in that packets contain no special information related to previous rule applications and carry with them no labels or other history information to support the community route filtering, other than the data carried in the standard protocol headers. The stateless processing applies to incoming packets from the network destined for the MCN, outgoing packets originating within the MCN destined for the network, and packets received from the network to be forwarded to another network by the MCN. In the forwarding case, the incoming and outgoing CRF processing are independent of each other—no CRF state from incoming packet processing need to be retained to be applied in outgoing packet processing. Advantageously, packets need not be modified and filtering rules may be applied without specific knowledge of the history of the packet (i.e., they are stateless). Likewise, the following two approaches are stateless.

Community Route Filtering Approach 2

In an alternative embodiment, to ensure that community separation policy is enforced for MCN 110's network communications, a Community Route Filter (CRF) in the protocol stack of MCN 110 applies rules on each incoming or outgoing packet. The CRF prevents a packet from flowing to networks outside the packet's communities. The enforcement has the same effect as those of Approach 1, but the database is organized differently and rules may be expressed differently as specified below.

Community Information Base (CIB)

A trusted administrator configures two sets of addresses for each interface: (1) the Attached Address Set (AAS), which are the addresses on the attached network or networks, and (2) the Peer Address Set (PAS), which are the addresses on other networks or within the MCN with which the nodes on the attached network or networks may communicate.

Packet Processing

Using the associations in the CIB, the alternative CRF rules may be applied to the sending and receiving of packets:

Alternative MCN Send Rule for Outgoing Packets

1. Validate that the source network address of the packet is within the PAS associated with the interface over which the packet will be output.
2. If it is not, discard the packet and record the event in a log of security relevant and other events.
3. Validate that the destination network address of the packet is within the AAS associated with the interface.
4. If it is not, discard the packet and record the event in a log of security relevant and other events.
5. Otherwise, if the packet passes both validations, allow transmit processing to proceed on the packet.

Alternative MCN Receive Rule for Incoming Packets

1. Validate that the source network address of the packet is within the AAS associated with the interface over which the packet was received.
2. If it is not, discard the packet and record the event in a log of security relevant and other events.
3. Validate that the destination network address of the packet is within the PAS of the interface over which the packet was received.
4. If it is not, discard the packet and record the event in a log of security relevant and other events.
5. Otherwise, if the packet passes both validations, allow receive processing to proceed on the packet.

Community Route Filtering Approach 3

In another embodiment, the community separation policy is enforced by ensuring that all routing table entries in MCN 110 comply with the policy. This, combined with restrictions on packet forwarding between interfaces and source address spoofing protection on incoming packets, ensures that community separation is enforced on MCN 110.

Community Information Base (CIB)

A trusted administrator configures databases for a MCN community route filtering function. For each of the MCN's interfaces, the administrator enters the Interface Community Set (IFCS), specifying the community set associated the each interface, and the Attached Address Set (AAS), specifying the destination addresses or destination subnets/prefixes that are reachable through the interface.

Ensuring Route Table Compliance

In Approach 3, the MCN validates all routing table updates to ensure that table entries comply with the community separation policy. The MCN may receive routing table updates from a router, other network node, or system administrator. The updates specify the next hop to a destination address or destination subnet. When the MCN receives a routing table update, functions it performs may include the following:

1. Determining the network interface through which the next hop will be reached. In one embodiment, the interface may be specified in the routing table update, or may be determined by finding the interface whose network address prefix (e.g., for IPv4, the network number and subnet number) matches that of the next hop.
2. Checking whether the destination address is within the AAS of the network interface.
3. If it is not, discard the routing table update and record the event in a log of security relevant and other events.
4. Otherwise, proceed with the routing table update.
5. As an alternative to step 2, the MCN may check that the NACS of the destination network address or network prefix is within the IFCS of the network interface through which packets for the destination will be routed.

Packet Processing

Outgoing Packets Originating on the MCN

The community separation enforcement relies on route table compliance with the community separation policy. If the route table complies, the MCN should never send a packet out a network interface (1) through which the destination address is not reachable and (2) whose community set does not include the community set associated with the destination.

Incoming Packets from an Attached Network

For incoming packets, the MCN:

1. Checks that the source address is within the AAS of the interface over which the packet was received.
2. If it is not, discards the packet and records the event in a log of security relevant and other events.
3. Otherwise, allows receive processing to proceed.

Step 1 may be implemented as a simple address look up of the source address in the AAS. Alternatively, the routing table can be used, assuming incoming and outgoing routes are symmetrical. In this alternative, if the MCN were to send a packet back to the node with this source address, it would send it out the interface on which this packet was received.

Packets Forwarded from One Network Interface to Another

For packet received on one interface to be forwarded to another, the MCN:

1. Computes the intersection of the incoming interface IFCS and the outgoing interface's IFCS.
2. If the intersection is not null, allows packet procession to proceed.
3. Otherwise, discards the packet and records the event in a log of security relevant and other events.

Community Route Filtering Scenarios

Figure 5:
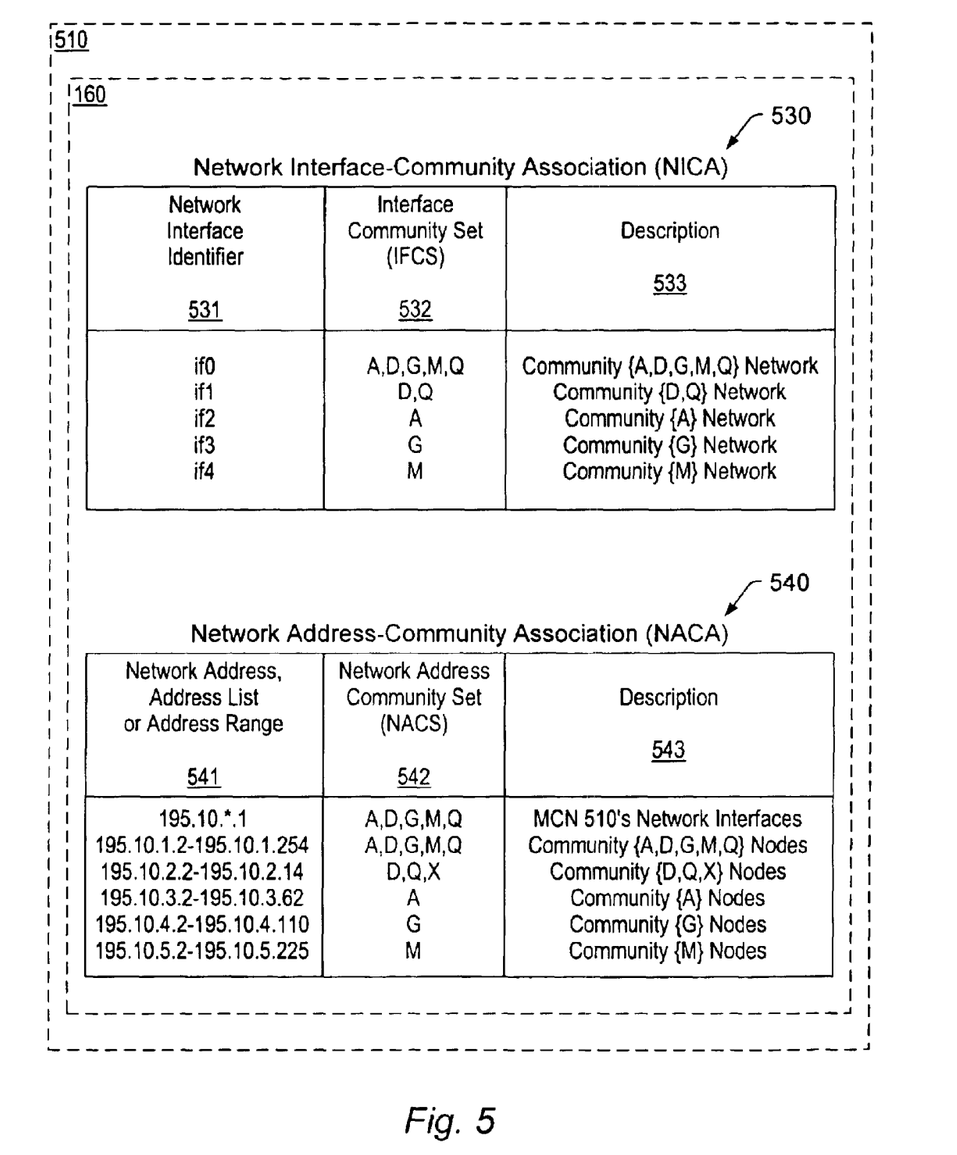
FIG. 5 is an illustration of an examplary community information base.

FIG. 5 shows one embodiment of Community Information Base (CIB) 160 in an MCN 510 using Community Route Filtering approach 1. In the exemplary embodiment shown, two associations are maintained in the CIB: (1) The Network Interface-Community Association (NICA) 530, that specifies, for each of MCN 510's network interfaces, the associated user community or community set, and (2) the Network Address-Community Association (NACA) 540, that specifies, for each network address used by MCN 510, the associated user community or community set. Excerpts from CIB 160 will be used in the discussions of FIGS. 6 and 7.

The first row in NICA 530 shows if0 of MCN 510 attached to a network used to communicate information for communities A, D, G, M, and Q by nodes serving those communities. The second row shows if1 of MCN 510 attached to a network used to communicate information for communities D and Q by nodes serving those communities. The third through fifth rows show if2, if3, and if4 of MCN 510 attached to networks used by nodes in communities A, G, and M, respectively.

NACA 540 shows the community or community set associated with each network address, list of network addresses, or range of network addresses. An asterisk is a wildcard, a notational convention indicating that any valid value can be used in the field of the address where the asterisk is. For illustrative purposes, Internet Protocol (IP) version 4 addresses are shown. Other embodiments could use IP version 6, or any other network layer or data link layer protocol. The first row of NACA 540 shows network addresses 195.10.1.1, 195.10.2.1, 195.10.3.1, 195.10.4.1, etc. are associated with the set of communities {A,D,G,M,Q}. These addresses are assigned to the local network interfaces on MCN 510. The second row shows a range of addresses 195.10.1.2–195.10.1.254 used for MCNs serving the set of communities {A,D,G,M,Q}. The third row shows a range of addresses 195.10.2.2–195.10.1.14 used for MCNs serving the set of communities {D,Q,X}. The fourth, fifth, and sixth rows show the range of addresses used by nodes in communities A, G, and M, respectively.

Figure 6:
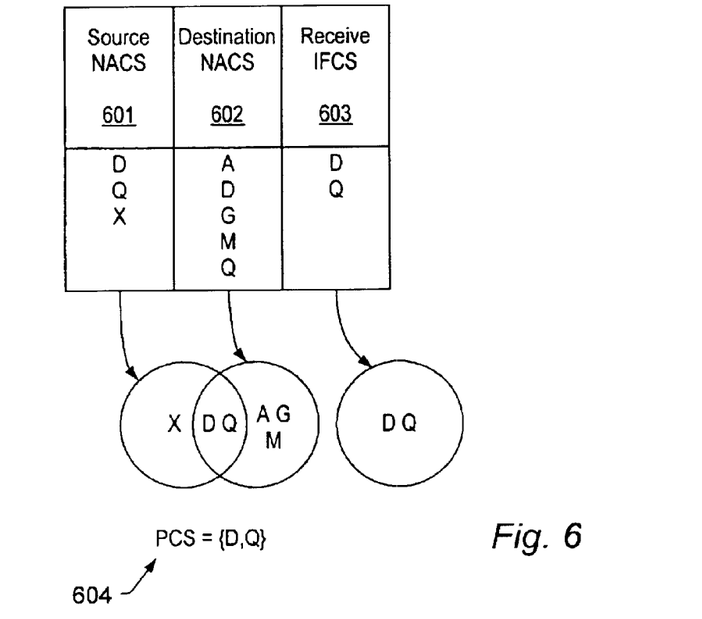
FIG. 6 illustrates the application of a community route filtering rule.

Turning now to FIG. 6, a scenario is presented in which MCN 510 has received a packet on one of its network interfaces if1 from an MCN 520, a node at address 195.10.2.5. MCN 510 serves communities A, D, G, M, and Q, while MCN 520 serves communities D, Q, and X. They have communities D and Q in common, and communicate information for their common communities over a network for communities D and Q. The IFCS on MCN 510 of the interface attached to the network over which the packet was received matches the community set of the network, i.e. {D,Q}. In the example shown, the NACS for each network address on MCN 510 is the same as the community set of the MCN.

In FIG. 6, MCN 510 queries the CIB's 160 NACA 540 for the community sets associated with the source and destination network addresses, illustrated as 601 and 602 in FIG. 6. It computes the PCS 604 from the intersection of the Source NACS 601 of MCN 520 {D,Q,X}, and the Destination NACS 602 of MCN 510 {A,D,G,M,Q}. The computed PCS 604 is {D,Q}. Since the PCS 604 is not null, no security violation of the community separation security policy has been attempted. Then, using information from the CIB's NICA 530, MCN 510 validates that the PCS is within the IFCS 603 for if1 on MCN 510, the network interface over which the packet was received. Since the IFCS is {D,Q} and the PCS is {D,Q}, there is no security violation, and MCN 510 proceeds with the receive processing for the packet.

Figure 7:
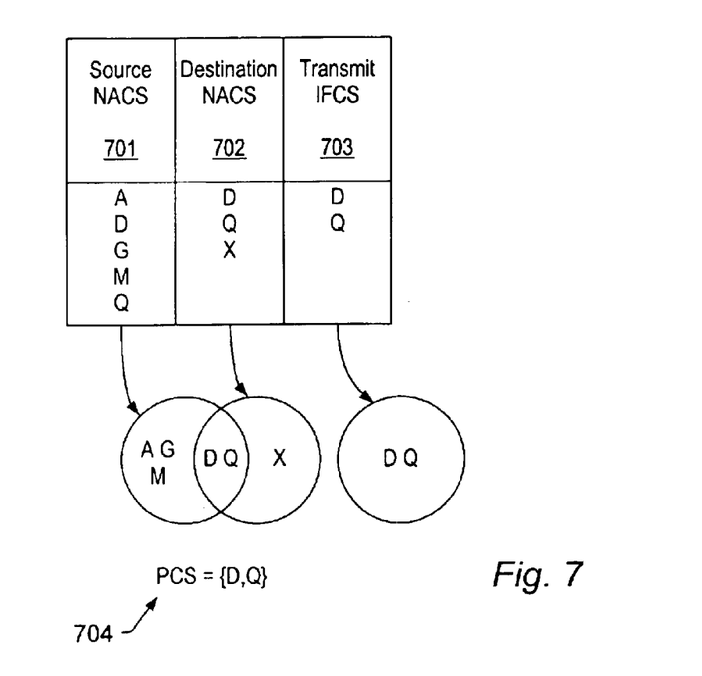
FIG. 7 illustrates the application of a community route filtering rule.

FIG. 7 illustrates a scenario in which MCN 510 is sending a packet to an MCN 520. MCN 510's CIB 160 is as illustrated in FIG. 5. MCN 510 computes the PCS 704 from the intersection of the Source NACS 701 for MCN 510 {A,D,G,M,Q} and the Destination NACS 702 for MCN 520 {D,Q,X}. The PCS is {D,Q}. Since the PCS is not null, no security violation of the community separation security policy has been attempted. MCN 510 then determines whether the PCS is within the IFCS 703 for if1, the network interface over which the packet will be transmitted. Since it is (i.e., they are both {D,Q}), MCN 510 proceeds with the transmit processing for the packet.

Community Route Filtering in Virtual Private Networks

A virtual private network (VPN) is a well known method whereby encryption and tunneling are used to create a private network while using a shared or public infrastructure, such as the Internet. For example, a particular enterprise may wish to provide a connection between its computer networks at sites which are located in different parts of the world. By using VPN technology, the enterprise may utilize the Internet for the communications while ensuring privacy and integrity. Alternatively, an enterprise may wish to share its network resources internally among users in multiple communities. Rather than use a physically separate network or virtual local area network for each community network, an enterprise may employ VPNs to carry traffic for each community over a shared network fabric. With VPNs, cryptographic methods are used to separate the traffic for each community over the same network resources, preventing users in one community from reading or modifying messages sent by users in a different community. VPNs are often (but not necessarily) implemented in the network layer, for example, in IP version 6 or the IP security extensions to IP version 4 (referred to as IPSec).

Figure 8:
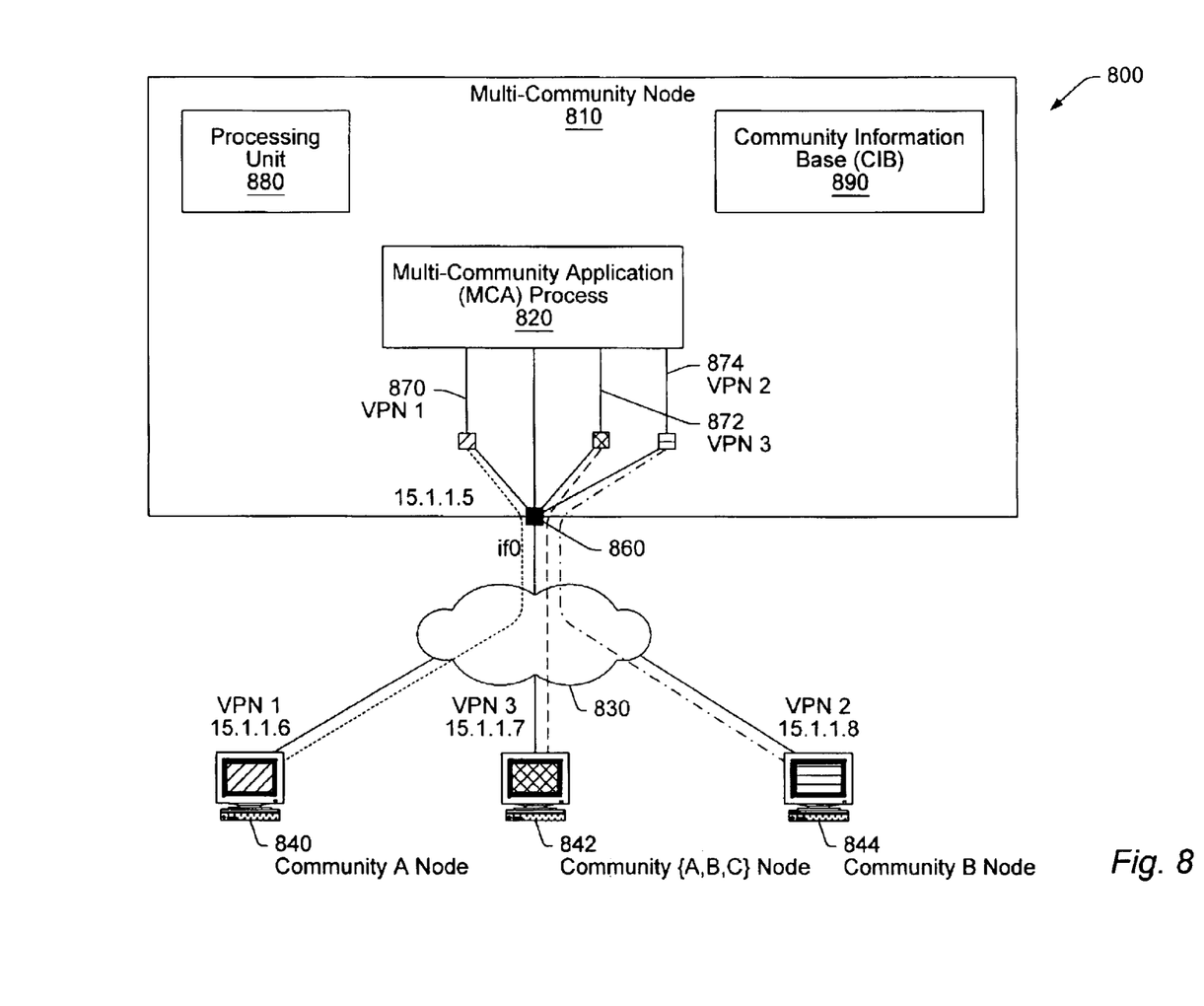
FIG. 8 is a diagram of an MCN using virtual private networks.

FIG. 8 is an illustration of a computer network 800 including three VPNs numbered VPN 1 870, VPN 2 874, and VPN 3 872. MCN 810 serves communities A, B, and C. Node 840 is a community A computer. It communicates with MCN 810 over VPN 1 870. Communications over VPN 1 870 travel encrypted over Encrypted Network 830. The encryption for VPN 1 870 is configured so that packets cannot be read or modified by entities outside of community A. The VPN encryption further allows authentication of the endpoints to each other, so that, at a minimum, they each can determine that the other is in community A. Communications between Community B Node 844 and MCN 810 are over VPN 2 874. Encrypted packets are carried over Encrypted Network 830. Communications between MCN 842, serving communities A, B, and C, and MCN 810, serving the same communities, are over VPN 3 872. Packets are encrypted and carried over Encrypted Network 830.

On MCN 810, the VPN interfaces all share a single physical interface, if0 860. A CIB 890 maintains an association between the VPNs and their communities or sets of communities (the VPN Community Set [VPNCS]). VPN 1 870 is associated with Community A, VPN 2 874 is associated with Community B, and VPN 3 872 is associated with the set of communities {A,B,C}. When MCN 810 sends packets out via network interface if0 860 to Nodes 840, 842, and 844, it encrypts the packets. Incoming packets received on if0 are decrypted, using cryptographic parameters associated with the VPN over which the message was communicated and using header information carried in the packet.

Any of the three Community Route Filtering approaches described above may be used with VPN, wherein the VPN may be treated as a subnet with network interfaces at each node communicating over the VPN. In one embodiment, the above described Community Route Filtering Approach 1 may be applied to VPNs. The VPNCS for each VPN is entered in MCN 810's CIB. Each network interface on MCB 810 may be assigned one of three encryption modes: Always Encrypt, Selective Bypass, or Never Encrypt. All data packets output over interfaces which have attribute Always Encrypt are encrypted, using cryptographic parameters and key for the appropriate VPN between the source and destination. All packets received from such a network are decrypted, using the cryptographic parameters for the VPN. For Selective Bypass interfaces, all data packets sent on the interface are encrypted using the appropriate VPN for the source and destination, except packets whose community sets are included in the Plaintext Community Set (PTCS) of the attached network. Received packets are decrypted if their headers indicate that they were encrypted. Selective Bypass may be used when nodes in the enterprise network share one or more common communities, but not all communities. For interfaces with the Never Encrypt attribute, encryption is not used.

The topology rule previously presented for the community route filtering also applies to VPNs. A node may access (read or write) a VPN only if the community set of the node includes the community set of the VPN. The community set of a VPN is the set of communities for which information may be communicated over the VPN. Therefore, when the Always Encrypt attribute is set for all nodes sharing a network, then VPNs connect nodes which have common communities. When the Selective Bypass attribute is set for nodes sharing a network, a PTCS is associated with the network. Nodes with the Selective Bypass attribute configured on a network interface may be connected to a network over that interface only if the community set of the node includes the PTCS of the network, and nodes may access a VPN only if the node's community set includes the VPNCS. VPNs may be dynamically established or statically set up. The trusted network administrator configures VPNs to allow or prohibit nodes from accessing them using a variety of methods including cryptographic key distribution and access control.

Figure 9A:
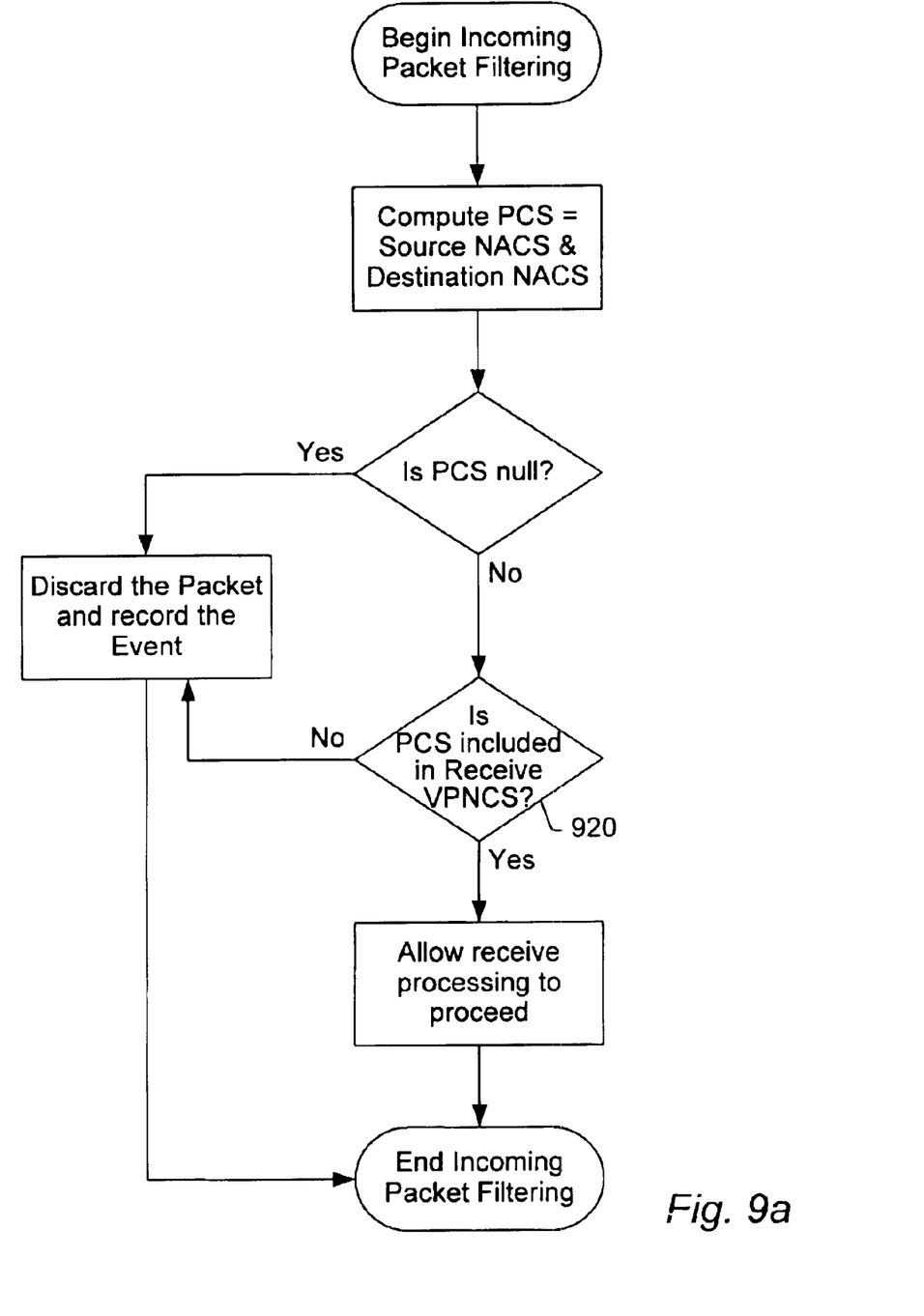
FIG. 9a is a flowchart illustrating one embodiment of a community route filter.

FIG. 9a is a flowchart illustrating the application of Community Route Filtering rules in the context of VPNs. The flowchart in FIG. 9 is identical to the flowchart in FIG. 4, with the exception of checking whether the PCS is within the VPNCS in 920 and 940 rather than within the IFCS in 420 and 440.

FIG. 9a is a flowchart illustrating one embodiment of a CRF. In FIG. 9a, the entry point "Begin Incoming Packet Filtering" is entered when a packet is received on one of MCN 810's network interfaces. The destination of the packet may be MCN 810, or MCN 810 may be forwarding the packet to another network. For incoming packet filtering, the CRF in MCN 810 computes the PCS from the intersection of the Source NACS and Destination NACS of the incoming packet. The PCS would be null if the source and destination nodes have no communities in common. Since attempts to communicate between such nodes is a violation of the community separation policy, the CRF discards the packet and records the event in a log of security-relevant and other events. If the PCS is not null, the CRF then checks whether the PCS is included in the receive VPNCS of the interface on which the packet was received (decision block 920). If it is not, this is a violation of the community separation policy and the packet is discarded. If the PCS is not included in the receive VPNCS, the CRF discards the packet and records the event. Otherwise, the CRF allows further packet receive processing to proceed.

Figure 9B:
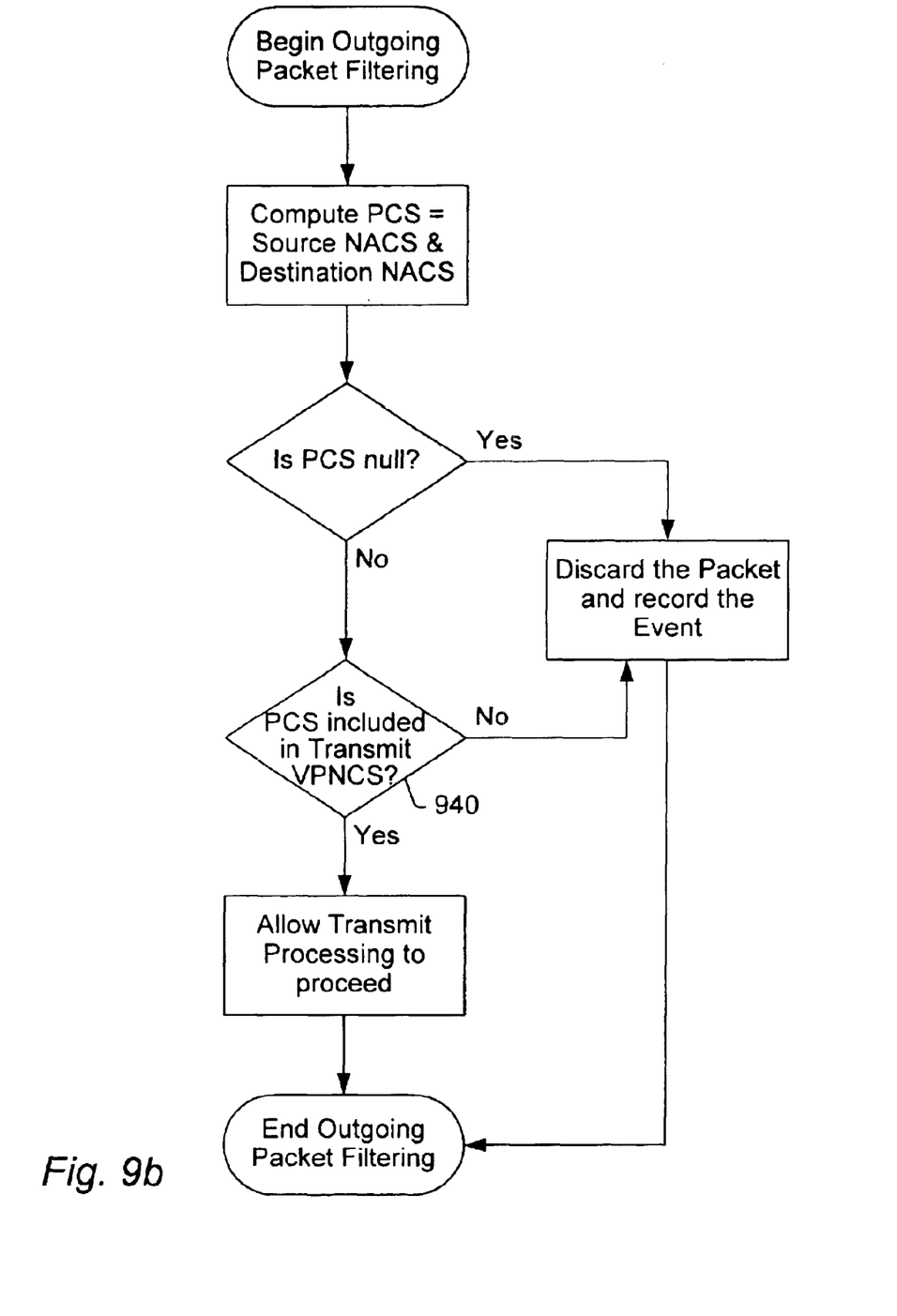
FIG. 9b is a flowchart illustrating one embodiment of a community route filter.

FIG. 9b is a flowchart illustrating one embodiment of a CRF applied to an outgoing packet in a VPN. The outgoing packet may have been generated by MCN 810, or may have been received on one of MCN's 810 network interfaces to be forwarded by MCN 810 and output on another network interface. For outgoing packet filtering, the CRF in MCN 810 computes the PCS from the intersection of the Source NACS and the Destination NACS. A null PCS indicates a violation of the community separation policy and the CRF discards the packet and records the event in a log of security relevant and other events. If the PCS is not null, MCN 810 determines whether the PCS is included in the transmit VPNCS of the network interface on which the packet will be output (decision block 940). If it is not, a violation of the community separation security policy has been attempted, and the CRF discards the packet and records the event in a log of security relevant and other events. Otherwise the CRF allows further transmit processing to proceed for the packet.

It is noted that the examples and figures described above are intended to be exemplary. Numerous variations and modifications will become apparent to those skilled in the art once the above disclosure is fully appreciated. Further, the above described methods and mechanisms may be used independently or in one of many combinations with each other where desired. It is intended that the following claims be interpreted to embrace all such variations and modifications.

What is claimed is:

1. A method of community separation control in a Multi-Community Node (MCN), said method comprising:

ensuring routing table compliance with a community separation policy, wherein all routing table updates are validated to ensure said compliance; and validating a data packet;

allowing further processing of said data packet in response to detecting said data packet is validated; and discarding said data packet in response to detecting said data packet is not validated;

wherein said validating said updates comprises:

determining a network interface through which a next hop corresponding to an update of said updates will be reached;

determining whether a first address corresponding to said next hop is within a first address set of said network interface;

discarding said update in response to determining said destination address is not within said first address set; and performing said update in response to determining said destination address is within said first address set.

2. The method of claim 1, wherein said network interface is said determined by either extracting an identification of said network interface from said update or by finding a network interface whose network address prefix matches that of said next hop.

3. The method of claim 1, wherein said first address is a destination address and said first address set is an Attached Address Set.

4. The method of claim 1, wherein said first address is a Network Address Community Set (NACS) corresponding to a destination address of said next hop, and wherein said first address set is an Interface Community Set (IFCS) of said network interface.

5. The method of claim 1, wherein said data packet is an outgoing data packet, and wherein validating said data packet comprises:

determining said destination address is reachable; and determining a community set corresponding to an interface over which said data packet is to be output includes a community set corresponding to said destination address.

6. The method of claim 1, wherein said data packet is an incoming data packet, and wherein validating said data packet comprises checking that a source address of said data packet is within an Attached Address Set of the interface over which said data packet was received.

7. The method of claim 1, wherein said data packet is received on a first interface of said MCN and is to be forwarded to a second interface of said MCN, and wherein validating said data packet comprises determining an intersection of an Interface Community Set (IFCS) of said first interface with an IFCS of said second interface is not null.

8. The method of claim 1 further comprising consulting a Community Information Base (CIB).

9. The method of claim 8, wherein said CIB includes an IFCS corresponding to each interface of said MCN, and an Attached Address Set corresponding to each interface of said MCN indicating destination addresses or destination subnets which are reachable through each of said interfaces.

10. The method of claim 1, further comprising recording an event corresponding to said update in response to determining said destination address is not within said first address set.

11. A multi-community node comprising:
a processing unit, wherein said processing unit is configured to ensure routing table compliance with a community separation policy, wherein all routing table updates are validated to ensure said compliance, validate a data packet, allow further processing of said data packet in response to detecting said data packet is validated, and discard said data packet in response to detecting said data packet is not validated; and
a community information base (CIB) coupled to said processing unit;
wherein in validating said updates said processing unit is configured to:
determine a network interface through which a next hop corresponding to an update of said updates will be reached;
determine whether a first address corresponding to said next hop is within a first address set of said network interface;
discard said update in response to determining said destination address is not within said first address set; and
perform said update in response to determining said destination address is within said first address set.

12. The node of claim 11, wherein said network interface is said determined by either extracting an identification of said network interface from said update or by finding a network interface whose network address prefix matches that of said next hop.

13. The node of claim 11, wherein said first address is a destination address and said first address set is an Attached Address Set.

14. The node of claim 11, wherein said first address is a Network Address Community Set (NACS) corresponding to a destination address of said next hop, and wherein said first address set is an Interface Community Set (IFCS) of said network interface.

15. The node of claim 11, wherein said data packet is an outgoing data packet, and wherein in validating said data packet said processing unit is configured to:
determine said destination address is reachable; and
determine a community set corresponding to an interface over which said data packet is to be output includes a community set corresponding to said destination address.

16. The node of claim 11, wherein said data packet is an incoming data packet, and wherein validating said data packet comprises checking that a source address of said data packet is within an AAS of the interface over which said data packet was received.

17. The node of claim 11, wherein said data packet is received on a first interface of said MCN and is to be forwarded to a second interface of said MCN, and wherein validating said data packet comprises determining an intersection of an Interface Community Set (IFCS) of said first interface with an IFCS of said second interface is not null.

18. The node of claim 11 further comprising consulting said CIB.

19. The node of claim 18 wherein said CIB includes an IFCS corresponding to each interface of said MCN, and an AAS corresponding to each interface of said MCN indicating destination addresses or destination subnets which are reachable through each of said interfaces.

20. The node of claim 11, further comprising recording an event corresponding to said update in response to determining said destination address is not within said first address set.

21. A computer network comprising:
a multi-community node (MCN), wherein said node comprises:
a processing unit, wherein said processing unit is configured to ensure routing table compliance with a community separation policy, wherein all routing table updates are validated to ensure said compliance, validate a data packet, allow further processing of said data packet in response to detecting said data packet is validated, and discard said data packet in response to detecting said data packet is not validated; and
a community information base (CIB) coupled to said processing unit;
a first computer network coupled to said MCN; and
a second computer network coupled to said MCN;
wherein in validating said updates said node is configured to:
determine a network interface through which a next hop corresponding to an update of said updates will be reached;
determine whether a first address corresponding to said next hop is within a first address set of said network interface;
discard said update in response to determining said destination address is not within said first address set; and
perform said update in response to determining said destination address is within said first address set.

22. The computer network of claim 21, wherein said node is configured to determine said network interface by either extracting an identification of said network interface from said update or by finding a network interface whose network address prefix matches that of said next hop.

23. The computer network of claim 21, wherein said first address is a destination address and said first address set is an Attached Address Set.

24. The computer network of claim 21, wherein said first address is a Network Address Community Set (NACS)

corresponding to a destination address of said next hop, and wherein said first address set is an Interface Community Set (IFCS) of said network interface.

25. The computer network of claim 21, wherein said data packet is an outgoing data packet originating in said MCN, and wherein in validating said data packet said node is configured to:

determine said destination address is reachable; and determine a community set corresponding to an interface over which said data packet is to be output includes a community set corresponding to said destination address.

26. The computer network of claim 21, wherein said data packet is an incoming data packet from said first computer network, and wherein validating said data packet comprises checking that a source address of said data packet is within an AAS of the interface over which said data packet was received.

27. The computer network of claim 21, wherein said data packet is received on a first interface of said MCN and is to be forwarded to a second interface of said MCN, wherein said first interface corresponds to said first computer network and said second interface corresponds to said second computer network, and wherein in validating said data packet said node is configured to determine that an intersection of an Interface Community Set (IFCS) of said first interface with an IFCS of said second interface is not null.

28. The computer network of claim 21, further comprising consulting said CIB.

29. The computer network of claim 28, wherein said CIB includes an IFCS corresponding to each interface of said MCN, and an AAS corresponding to each interface of said MCN indicating destination addresses or destination subnets which are reachable through each of said interfaces.

30. The computer network of claim 21, further comprising recording an event corresponding to said update in response to determining said destination address is not within said first address set.

* * * * *